US009031177B2

(12) United States Patent
van der Goes et al.

(10) Patent No.: US 9,031,177 B2
(45) Date of Patent: May 12, 2015

(54) DIGITAL CALIBRATION OF ANALOG DISTORTION USING SPLIT ANALOG FRONT-END

(71) Applicant: Broadcom Corporation, Irvine, CA (US)

(72) Inventors: Frank van der Goes, The Hague (NL); Jan Roelof Westra, Uithoorn (NL)

(73) Assignee: Broadcom Corporation, Irvine, CA (US)

( * ) Notice: Subject to any disclaimer, the term of this patent is extended or adjusted under 35 U.S.C. 154(b) by 44 days.

(21) Appl. No.: 13/722,429

(22) Filed: Dec. 20, 2012

(65) Prior Publication Data

US 2014/0177768 A1    Jun. 26, 2014

(51) Int. Cl.
H04B 1/10    (2006.01)
H04L 27/00    (2006.01)

(52) U.S. Cl.
CPC ................................ *H04L 27/0002* (2013.01)

(58) Field of Classification Search
None
See application file for complete search history.

(56) References Cited

U.S. PATENT DOCUMENTS

| | | | | |
|---|---|---|---|---|
| 5,563,596 A * | 10/1996 | Snyder et al. | ................... | 341/131 |
| 5,825,318 A * | 10/1998 | Patapoutian et al. | ......... | 341/131 |
| 5,963,157 A * | 10/1999 | Smith | ............................ | 341/131 |
| 6,097,324 A * | 8/2000 | Myer et al. | ..................... | 341/118 |
| 6,259,300 B1 * | 7/2001 | Yasuda et al. | .................. | 327/333 |
| 7,142,137 B2 * | 11/2006 | Batruni | ........................... | 341/118 |
| 7,535,389 B1 * | 5/2009 | Teterwak | ....................... | 341/118 |
| 7,917,337 B2 * | 3/2011 | Batruni | ........................... | 702/190 |
| 8,436,759 B2 * | 5/2013 | Doris et al. | ..................... | 341/155 |
| 2005/0219088 A1 * | 10/2005 | Batruni | ........................... | 341/118 |
| 2006/0000979 A1 * | 1/2006 | Xie et al. | ................. | 250/363.03 |
| 2006/0092057 A1 * | 5/2006 | Slavin | ............................ | 341/118 |
| 2007/0030189 A1 * | 2/2007 | Batruni | ........................... | 341/118 |
| 2009/0256734 A1 * | 10/2009 | Wu | ................................ | 341/155 |
| 2009/0268094 A1 * | 10/2009 | Lin et al. | ........................ | 348/572 |
| 2010/0085231 A1 * | 4/2010 | Doris | ............................ | 341/155 |
| 2010/0176980 A1 * | 7/2010 | Breitschadel et al. | ......... | 341/155 |
| 2010/0322360 A1 * | 12/2010 | Braicu et al. | ................... | 375/345 |
| 2011/0063148 A1 * | 3/2011 | Kolze et al. | ..................... | 341/118 |
| 2011/0227768 A1 * | 9/2011 | Kolze et al. | ..................... | 341/118 |
| 2011/0241912 A1 * | 10/2011 | Doris et al. | ..................... | 341/110 |
| 2012/0002770 A1 * | 1/2012 | Morita et al. | ................... | 375/350 |
| 2012/0229209 A1 * | 9/2012 | Fudaba et al. | ................. | 330/149 |
| 2012/0306673 A1 * | 12/2012 | Ueno | ............................. | 341/118 |
| 2013/0249720 A1 * | 9/2013 | Matsuura et al. | .............. | 341/118 |
| 2013/0285742 A1 * | 10/2013 | van Zelm et al. | ............. | 330/149 |
| 2014/0029660 A1 * | 1/2014 | Bolstad et al. | ................. | 375/232 |

* cited by examiner

*Primary Examiner* — Zewdu Kassa

(74) *Attorney, Agent, or Firm* — Sterne, Kessler, Goldstein & Fox PLLC

(57) ABSTRACT

A receiver is disclosed that is capable of correcting for harmonic distortion injected into received analog signals. The receiver splits the analog signal in the analog front-end and modifies the split analog signals with a difference signal. After amplification and/or sampling, the modified analog signals are recombined in a main data pathway and are kept separate in a secondary pathway. Utilizing the difference signal, a feedback loop that includes distorters and an LMS filter detects the distortion coefficient of the harmonic distortion. A distorter in the main data pathway utilizes the detected distortion coefficient to correct the harmonic distortion in the analog signal.

20 Claims, 5 Drawing Sheets

DIGITAL CALIBRATION OF ANALOG DISTORTION USING SPLIT ANALOG FRONT-END

BACKGROUND

1. Technical Field

The disclosure relates to correcting for analog distortion in a communication system, and specifically to correcting for analog distortion in the digital domain.

2. Related Art

Most receivers in communication systems include an analog front-end, which is designed to receive signals transmitted to the receiver via a communication medium, such as any form of wired or wireless communication interface. Components of the analog front-end naturally inject a certain level of distortion into received signals, which should be corrected so as to maximize receiver sensitivity.

Conventionally, a significant amount of power is required to drive the necessary circuitry for correcting for this distortion. Additionally, in many instances, even when the large amount of power is spent, the circuit is still unable to sufficiently correct for the distortion. Further, the conventional techniques for correcting for the distortion rely on signal properties, pilot tone crosstalk, and/or master/slave matching, which can make for a complex and power hungry distortion correction.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Figure 1:
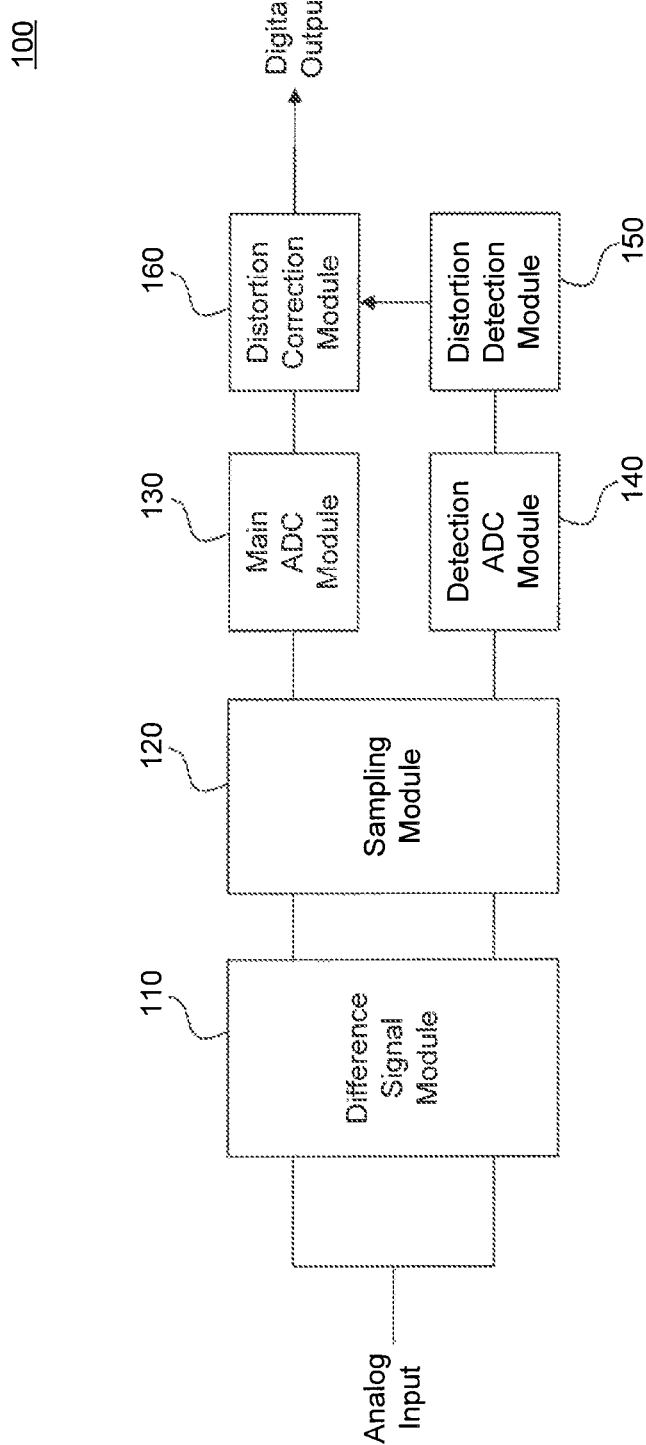
FIG. 1 illustrates a block diagram of an exemplary receiver circuit.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Those skilled in the relevant art(s) will recognize that this description may be applicable to many various charging and/or communication methods without departing from the spirit and scope of the present disclosure.

An Exemplary Wireless Power Transfer Environment

FIG. 1 illustrates a block diagram of an exemplary receiver circuit 100. The receiver circuit includes a differential module 110, a sampling module 12, a main analog-to-digital converter (ADC) module 130, a second ADC module 140, a distortion detection module 150, and a distortion correction module 160.

The receiver circuit 100 is capable of performing data communication and exchange with one or more other communication devices. The receiver circuit 100 may communicate using any number of wired and/or wireless communication protocols and receives, as an input, an analog signal transmitted in the continuous domain.

The receiver circuit 100 splits the analog input, so as to supply duplicates of the analog input to multiple different signal paths. FIG. 1, for example, shows the analog input being split into two duplicates and transmitted to two data paths. However, the disclosure is not limited to two data paths.

The difference module 110 injects a difference signal into the data paths having the duplicate analog inputs. After the analog signals have been injected with the difference components, a sampling module 120 samples the analog signals to prior to digital conversion. The sampling module 120 causes harmonic distortion, for which correction is performed, in the signals, and provides the resulting distorted signals to the main ADC 130.

The first sampled analog component signal is converted from the continuous domain to the discrete domain by a main ADC module 130. In an embodiment, the main ADC module 130 is fast and may require high power, at least when compared to the detection ADC module 140. The detection ADC module 140 converts the second sampled analog component signal from the continuous domain to a second digital component signal in the discrete domain. In an embodiment, the detection ADC module 140 is slow, low-power, and accurate, at least when compared to the main ADC module 130. The distortion detection module 150 receives the second digital component signal from the detection ADC module 140, and detects one or more distortion components of the second digital component signal.

The distortion correction module 160 receives the one or more distortion components from the distortion detection module 150, and corrects the distortion in a first digital component signal (generated from the first analog component signal) using the one or more distortion components. This corrected signal is then output as a digital output, which is substantially free of distortion.

The components of the receiver circuit 100 and their respective functions will be described in further detail below, with reference to their accompanying figures.

Exemplary Receiver Circuit According to a First Embodiment

Figure 2:
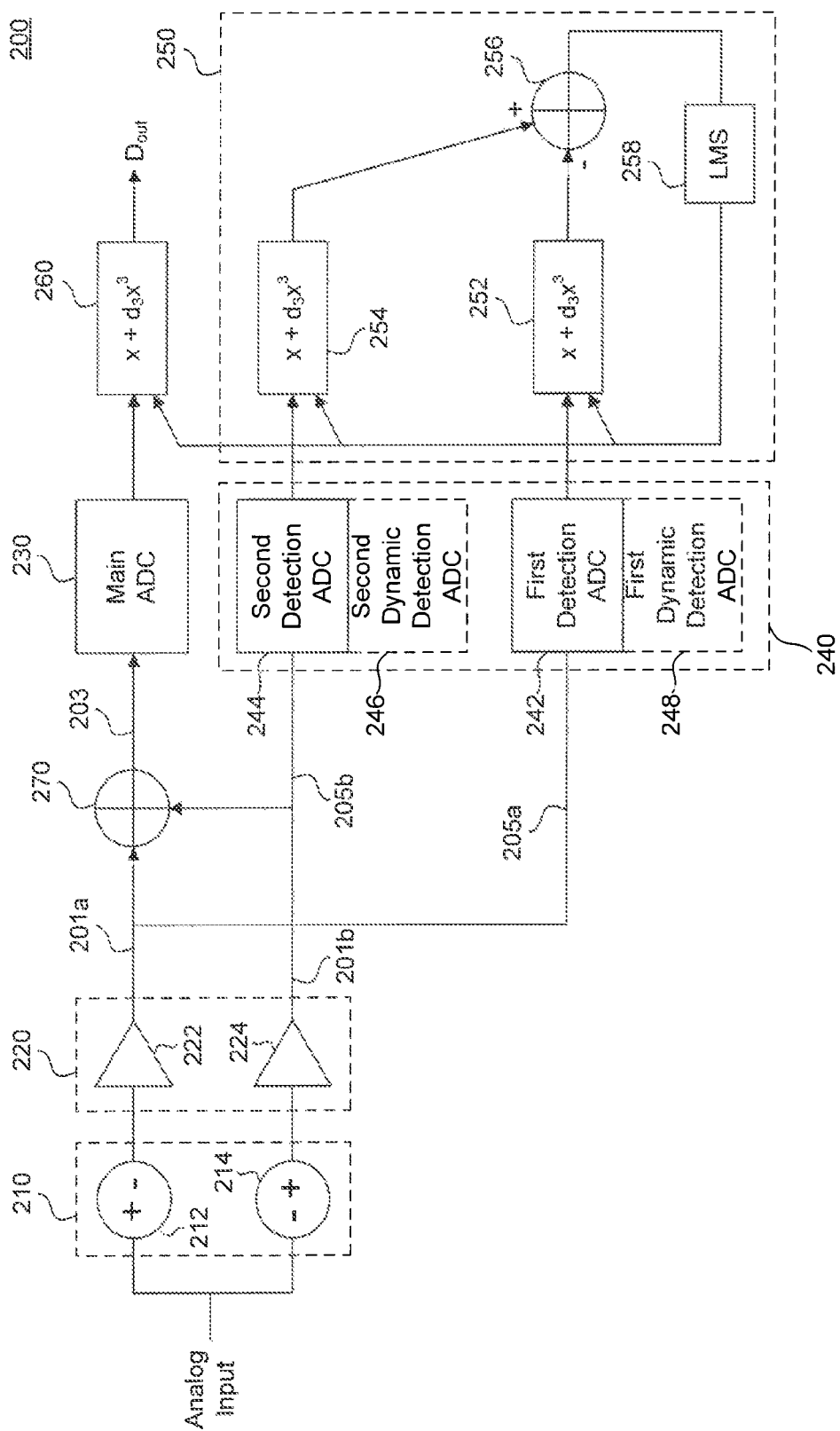
FIG. 2 illustrates a circuit diagram of an exemplary receiver circuit.

FIG. 2 illustrates a circuit diagram of an exemplary receiver circuit 200 according to a first embodiment. The receiver circuit 200 includes a difference signal module 210, a sampling module 220, a detection ADC module 240 and a distortion detection module 250, and may represent an exemplary embodiment of the receiver 100.

The receiver 200 receives an analog input signal. The analog input signal may represent analog or digital data, and may be received over a wireless or wired connection. Once received, the receiver circuit 200 splits the analog input so as to pass down multiple data pathways 201. In an embodiment, a first analog component signal that passes through the first data pathway 201a is substantially a duplicate of a second analog component signal that passes through the second data pathway 201b.

The difference signal module 210 receives the first and second analog component signals and injects a difference signal therein. The difference signal module 210 may include a first difference signal injector 212 and a second difference signal injector 214. The first difference signal injector 212 injects a first component of the difference signal into the first data pathway 201a, and the second difference signal injector 214 injects a second component of the difference signal into the second data pathway 201b. In an embodiment, the first and second difference signal injectors correspond to positive and negative ends of a current or voltage source. In other words, the difference signal injectors are complimentary voltage sources (e.g. DC) having a common amplitude but opposite in polarity. By injecting the difference signal into the analog component signals, the receiver circuit 200 is capable of detecting the distortion injected into those signals, as will be seen below.

After the difference signal has been injected into the analog input, the first and second analog components travel to the sampling module 220. The sampling module 220 includes a first amplifier 222 and a second amplifier 224. The first amplifier 222 amplifies the first analog component signal in the first data pathway 201a and the second amplifier 224 amplifies the second analog component signal in the second data pathway 201a. In an embodiment, the first amplifier 222 and the second amplifier 224 are low-noise amplifiers.

In addition to performing amplification, the first amplifier 222 and second amplifier 224 may also perform sampling. During the amplification and/or sampling, the first amplifier 222 and second amplifier 224 will inherently inject undesired harmonic distortion into the first analog signal component and second analog signal component, respectively, which can be represented by:

$$V_a = (V_{in} \pm D) + a_3(V_{in} \pm D)^3, \quad (1)$$

where $V_a$ is the amplified signal, $V_{in}$ is the input signal, D is the difference signal, and $a_3$ is a third harmonic distortion coefficient associated with the amplifiers 222/224. In an embodiment, the first amplifier 222 and the second amplifier 224 are matched so as to produce substantially similar distortions in the corresponding analog signal components. Also, because the distortion injected by the amplifiers 222 and 224 will be corrected later in the receiver circuit 200, the amplifiers 222 and 224 can be relatively simple and/or non-linear, which can reduce overall manufacturing cost of the receiver circuit 200.

Once amplified and/or sampled, the first and second analog component signals are recombined by adder 270, and placed on a main data pathway 203. By adding the first and second component signals, at least the linear portions of the difference signal injected into those component signals cancels each other out. The resulting signal is the original analog input signal and its acquired distortion from the amplification/sampling. This analog input signal is then converted to a main digital signal by the main ADC 230. The main digital signal is representative of the original analog input signal and its acquired distortion, where the distortion is mitigated using the distortion correction module 260 as discussed below.

In some instances, non-linear residual difference signal portions may remain in the recombined signal depending on a size of distortion injected by the amplifiers 222/224. For example, if the output of the first amplifier 222 is represented by:

$$V_{a1} = (V_{in} + D) + a_3(V_{in} + D)^3, \quad (2)$$

and the output of the second amplifier 224 is represented by:

$$V_{a2} = (V_{in} - D) + a_3(V_{in} - D)^3, \quad (3)$$

then the recombined signal can be represented by:

$$V_r = V_{a1} + V_{a2}. \quad (4)$$

By plugging equations (2) and (3) into equation (4), equation (4) can be simplified to:

$$V_r = 2V_{in}(1+3a_3D^2) + 2a_3V_{in}^3. \quad (5)$$

The difference signal D is added/subtracted to the input of both split parts of the input signal, which requires directly more headroom at the amplifier 220. As can be seen from equation (5), the difference signal D makes the linear part of the signal larger. Because only the linear portions of the recombined signal $V_r$ would require additional head room in the Main ADC 230, the residual non-linear portions of the recombined signal do not require any additional head room in the Main ADC 230. Therefore, headroom impact on the Main ADC 230 is minimal. Further, high-pass filtering the $D_{out}$ signal (after distortion correction) will remove the remaining residual portions of the difference signal from the output.

In addition to being recombined, the analog component signals 201a and 201b also continue separately on corresponding detection pathways 203 to the detection ADC module 240. The detection ADC module 240 includes a first detection ADC 242 and a second detection ADC 244.

The first analog component signal is sent along a first detection pathway 205a and received by the first detection ADC 242. Meanwhile, the second analog component signal is sent along a second detection pathway 205b and received by the second detection ADC 244. In an embodiment, the first detection ADC 242 and the second detection ADC 244 are low-power and slow (relative to the main ADC 230), but are highly accurate. The first detection ADC 242 and the second detection ADC 244 convert the corresponding analog component signals to respective first and second digital component signals, and forward the first and second digital component signals to the distortion detection module 250.

In an embodiment, the detection ADC module 240 also includes a first dynamic detection ADS 248 and a second dynamic detection ADC 246. The first dynamic detection ADS 248 and the second dynamic detection ADC 246 can be used in a receiver configuration for detecting and correcting for dynamic distortion. In such a configuration, the first analog component signal is first sampled by the first detection ADS 242, and then subsequently sampled by the first dynamic detection ADS 248. Similarly, the second analog component signal is first sampled by the second detection ADC 244, and then subsequently sampled by the second dynamic detection ADC 246 in order to provide dynamic information for detecting and correcting dynamic distortion.

The distortion detection module 250 includes a first distorter 252, a second distorter 254, and adder 256, and a least means squared (LMS) module 258, all configured to form a feedback loop. The first distorter 252 injects a third harmonic distortion into the first digital component signal with a distortion coefficient of $d_3$. Similarly, the second distorter injects a third harmonic distortion into the second digital component signal with the same distortion coefficient $d_3$. The distorted digital component signals are then sent to the adder 256. It is remembered that the first and second distorted digital component signals separately include effects of the respective difference component signals, added prior to sampling 220.

The adder 256 subtracts the distorted first digital component signal from the distorted second digital component signal. The resulting difference is sent to the LMS module 258. The LMS module 258 performs least means squared filtering on the received signal to determine whether the value of the distortion coefficient $d_3$ should remain, or should be increased or decreased. Because the analog component signals were loaded with the difference signal, the digital signals now provide the LMS module 258 with information for performing distortion correction. If the difference signal is small, the signal that carries the distortion information is also small. This means that this signal could be much smaller than noise. A lot of noise averaging will then be needed to obtain the distortion information. Alternatively, if the difference signal is large, the signal that carries the distortion information is also large, making it easy to separate the distortion information from the noise. The least means squared module 258 operates to minimize an STD of the difference output.

In particular, the least means squared module 258 determines whether harmonic distortion exists in its received signal. This will occur when the distortion component $d_3$ in the distorters 252 and 254 is other than a value capable of sufficiently correcting for the harmonic distortion caused by the sampling module 220. In particular, distorter 252 produces an output that includes distortion attributable to the first (or positive) component of the difference signal added by first difference signal injector 212, in addition to the background distortion of the attributable to the analog input signal. Likewise, distorter 254 produces an output that includes distortion attributable to the second (or negative) component of the difference signal added by the second difference signal injector 212, in addition to the background distortion of the attributable to the analog input signal. The LMS module 258 in the feedback configuration operates to drive the output of the adder module 256 to zero, adjusting the distortion component $d_3$ until the separate distortions related to the difference signal cancel each other out, in addition to cancellation of the background distortion.

Depending on the information contained within the signal received by the LMS module 258, the LMS module will allow the distortion component $d_3$ to remain the same (when little or no harmonic distortion is detected), or will increase or decrease the distortion component $d_3$ in order to seek correction of the harmonic distortion. Through the feedback loop configuration of the distortion detection module 250, the LMS module 258 will continue to update the value of the distortion component $d_3$, and provide the updated values to the distorters 252 and 254 until no further correction is needed.

In addition to forwarding the distortion component $d_3$ to the distorters 252 and 254, the LMS module 258 also forwards the distortion components to the distortion correction module 260. The distortion correction module 260 is included in the main data pathway 203 and functions in substantially the same way as the distorters 252 and 254. In particular, the distortion correction module 260 injects the signal in the main data pathway 203 with corrective harmonic distortion using the distortion component $d_3$ provided by the LMS module 258 in the distortion detection module 250. By injection of this corrective harmonic distortion, the harmonic distortion caused by the sampling module 220 can be substantially corrected, as shown below (for purposes of this example, we presume that no residual difference signal remains in the main signal):

$$D_{out} = (V_{in} + a_3 V_{in}^3) + d_3(V_{in} + a_3 V_{in}^3)^3. \quad (6)$$

which can be expanded to:

$$D_{out} = V_{in} + (a_3+d_3)V_{in}^3 + 3a_3d_3V_{in}^5 + 3a_3^2 d_3 V_{in}^7 + a_3^3 d_3 V_{in}^9. \quad (7)$$

As can be seen from equation (7), when $a_3 \lll 1$, equation (7) can be simplified to:

$$D_{out} = V_{in} + (a_3+d_3)V_{in}^3. \quad (8)$$

As can be seen from the above equations, when $d_3$ is set to $-a_3$ (which can be detected by the LMS module 258), the distortion correction module 260 can substantially correct for the harmonic distortion injected by the sampling module 220, provided that the distortion coefficient $a_3$ is much less than 1. This causes the output signal $D_{out}$ of the receiver 200 to be linear despite the non-linear distortion caused by the sampling module 220. In this manner, the receiver 200 can substantially correct for distortion while maintaining low power consumption.

Exemplary Receiver Circuit According to a Second Embodiment

Figure 3:
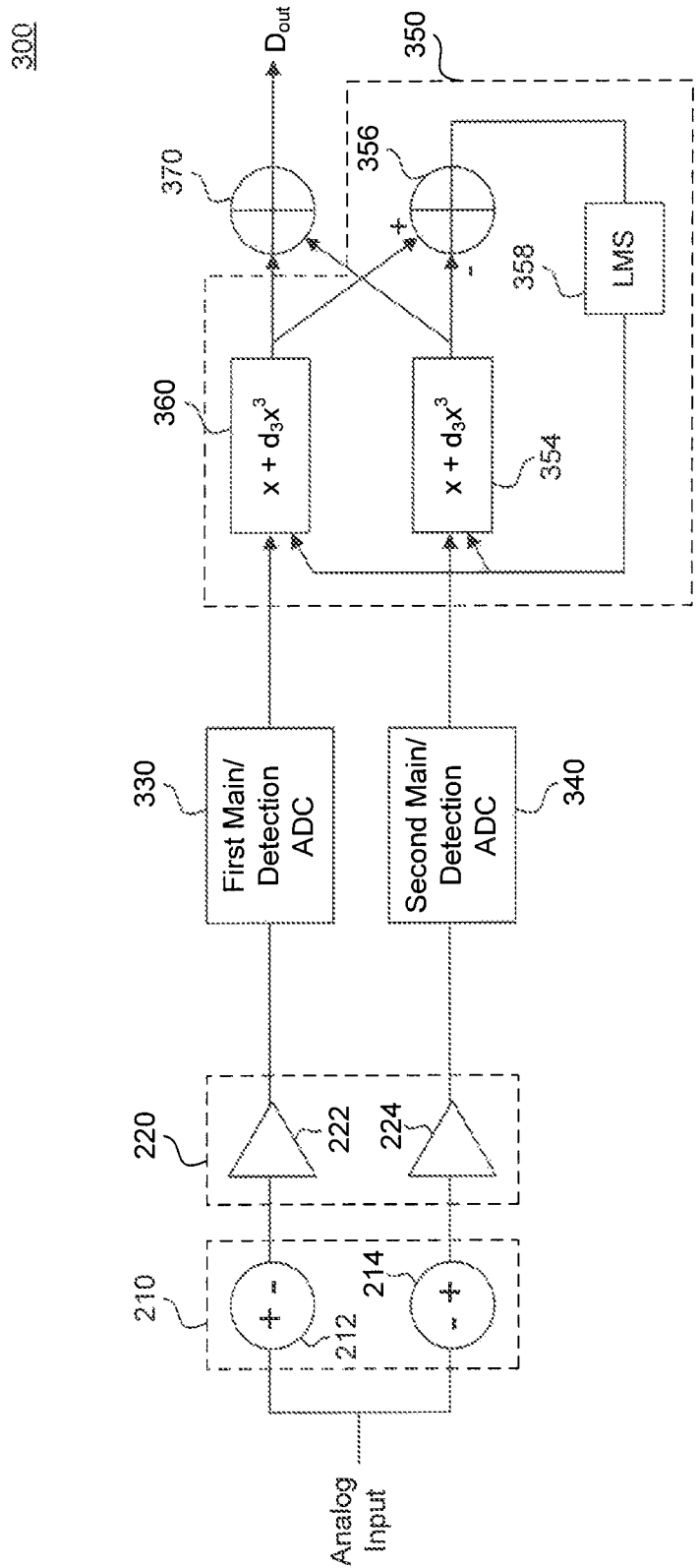
FIG. 3 illustrates a circuit diagram of an exemplary receiver circuit.

FIG. 3 illustrates a circuit diagram of an exemplary receiver circuit 300 according to a second embodiment. The receiver circuit 300 includes a distortion detection module 350 and an adder 370.

The distortion detection module 350 includes a distortion correction module 360 and a second distorter 354. The distortion detection module 350 functions both as the distortion correction module 260 and the first distorter 252 of FIG. 2. The distortion correction module 360 and the second distorter 354 are again configured in a feedback loop with the adder 356 and the LMS module 358.

In this configuration, the distortion correction module 360 is positioned in the main data pathway and receives a component signal from a first main/detection ADC 330. The second distorter 354 is included in the second data pathway and receives a component signal from the second main/detection ADC 340. In an embodiment, the first main/distortion ADC 330 and the second main/detection ADC 340 are the equivalents of the main ADC 230 being split into two identical parts (each half the size of the main ADC 230), and both function as both a main ADC and a detection ADC at the same time. This may require additional overhead, but allows for the distortion caused by the ADCs 330 and 340 to be corrected.

The distortion correction module 360 distorts its received component signal with a third harmonic distortion using a distortion coefficient of $d_3$, and provides the result to the adder 356. Similarly, the second distorter 354 distorts its received component signal with a third harmonic distortion using the distortion coefficient $d_3$, and provides its result to the adder 356.

The adder 356 subtracts the distorted signal received from the second distorter 354 from the distorted signal received from the distortion correction module 360, and provides the result to the LMS module 358. The LMS module 358 functions substantially similar to the LMS module 258, and adjusts the value of the distortion coefficient $d_3$ to substantially remove the harmonic distortion injected by the sampling module 220.

The LMS module 358 forwards updated $d_3$ values to the second distorter 354 and to the distortion correction module 360. In addition to providing the distorted signals to the adder 356, the distortion correction module 360 and the second distorter 354 also output their distorted signals to the adder 370. The adder 370 combines the distorted component signals back into a signal digital output $D_{out}$. Like the receiver circuit 200 of FIG. 2, the output signal $D_{out}$ will be substantially free from third harmonic distortion when the LMS module 358 sets the distortion coefficient $d_3$ to be substantially equal to $-a_3$.

Because the component signals output by each of the first main/detection ADC 330 and the second main/detection ADC 340 form part of the final output signal $D_{out}$, each of the ADCs 330 and 340 are required to be fast, which can require more power consumption. However, the receiver circuit 300 according to this embodiment has a simple design, and requires few components.

Modifications to the Receiver Circuits

As discussed above, each of the receiver circuits 200 and 300 is capable of detecting and substantially correcting for third harmonic distortion injected by the sampling module 220 or other components. However, as can be seen from equations (6)-(8), this correction assumes a distortion coefficient $a_3$ that is much less than 1. However, when this assumption is not true, additional harmonic distortion components may exist that require correction. For example, a $5^{th}$ harmonic distortion may require correction in order to achieve a substantially linear output. In other scenarios, it may be desired to cancel higher order harmonics solely to achieve even higher performance.

In this situation, the LMS modules 258/358 can be configured to detect, in addition to the $3^{rd}$ harmonic distortion coefficient $d_3$, a $5^{th}$ harmonic distortion coefficient $d_5$ (and/or additional higher order harmonic distortion coefficients). In addition, the distorters 252/254/354 and the distortion correction modules 260/360 can be modified to distort their received signals according to the following equation:

$$\text{Output}=X+d_3X^3+d_5X^5. \quad (9)$$

In this configuration, the LMS modules 258/358 become more complex in order to separately perform operations on each of the harmonic distortions. For example, one way to separate the different harmonic distortions is to perform curve fitting on a difference output of the LMS modules 258/358. After convergence, the difference output does not depend on input anymore, so the STD is zero.

Exemplary Difference Signal Module

Figure 4:
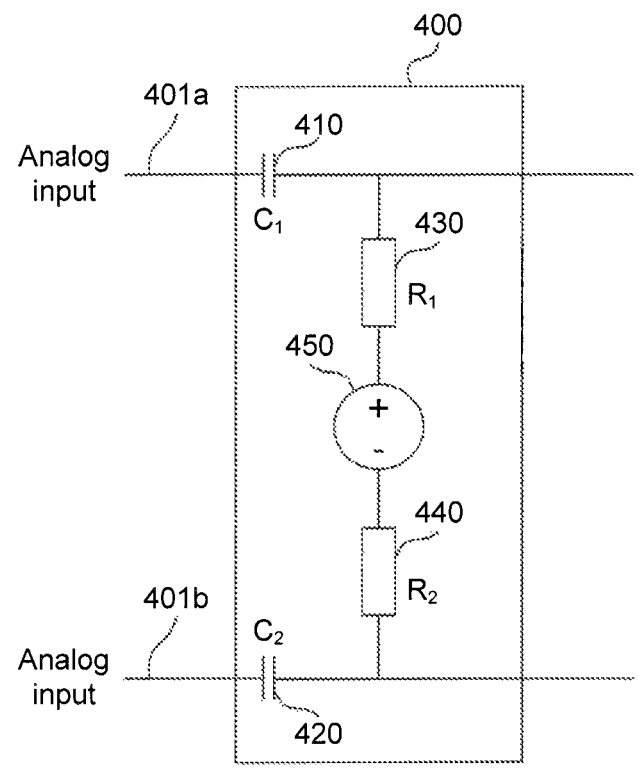
FIG. 4 illustrates a circuit diagram of an exemplary difference signal module.

FIG. 4 illustrates a circuit diagram of an exemplary difference signal module 400 that is one embodiment of difference signal module 220. The difference signal module 400 includes a capacitor $C_1$ 410, a capacitor $C_2$, a source 450, a resistor $R_1$ 430l and a resistor $R_2$ 440.

The capacitor $C_1$ is disposed in the first data pathway 401a and the capacitor $C_2$ is disposed in the second data pathway 401b. The source 450 is connected to the first data pathway 401a via the resistor $R_1$ 430, and is connected to the second data pathway 401b via the resistor $R_2$ 440. The source 450 may be a voltage source, a current source, or other similar device. As a result of the source 450, the signal passing through the first data pathway 401a will be output from the difference signal module 400 with an increased value (current or voltage) compared to the signal passing through the second data pathway 401b.

Exemplary Method for Correcting for Harmonic Distortion in a Receiver

Figure 5:
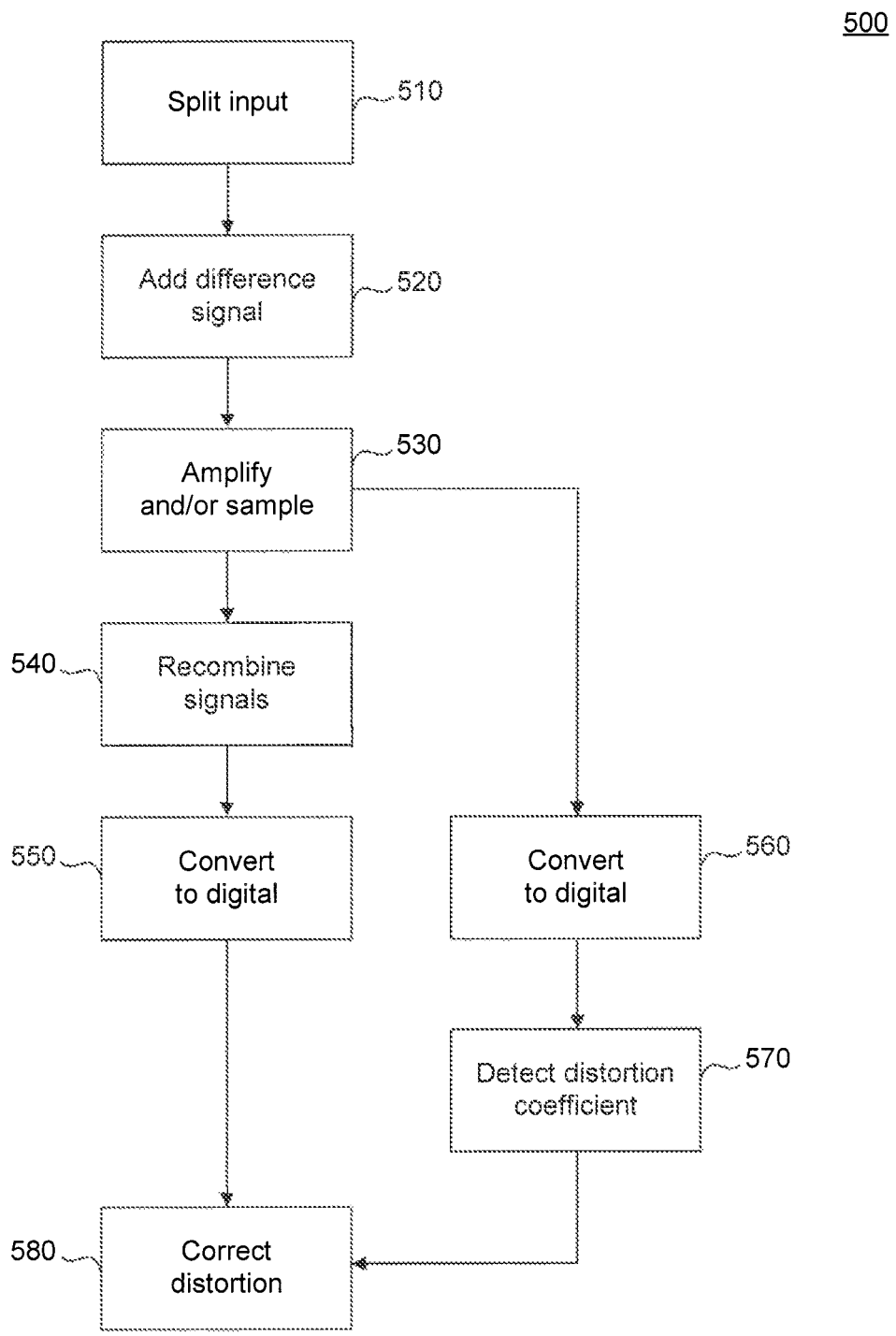
FIG. 5 illustrates a flowchart of an exemplary method for correcting for analog front-end distortion.

FIG. 5 illustrates a flowchart of an exemplary method for correcting for analog front-end distortion in a receiver.

For an analog input signal, the receiver splits the analog input into two or more analog component signals (510). Once split, the receiver adds a difference signal to the analog component signals (520). The resulting analog component signals are then amplified and/or sampled (530), which may cause harmonic distortion to be injected into the analog component signals.

After amplification (530), on a main data pathway, the analog component signals are recombined (540). This causes at least a linear portion of the difference signal to substantially cancel out of the recombined signal. The recombined signal is then converted into the digital domain (550).

At the same time, the amplified analog component signals are sent separately down a secondary data pathway. The analog component signals are converted to digital domain (560). Following the conversion, a distortion coefficient for correcting for the distortion injected during amplification (530) is detected. This may be performed, for example, by distorting the digitized component signals and taking the difference between them, and then using an LMS filter to detect the distortion coefficient.

After detection of the distortion coefficient (570), the distortion coefficient is used in the main data pathway to correct for the distortion of the recombined signal (580).

Those skilled in the relevant art(s) will recognize that the above method can additionally or alternatively include any of the functionality of the receivers 200/300 discussed above, as well as any of its modifications. For example, in an embodiment, the secondary data pathway may overlap with the main data pathway, and the recombining (540) may be performed after distortion correction (580). Further, the above description of the exemplary method should neither be construed to limit the method nor the description of the receivers 200/300.

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. A receiver, comprising:
   a difference signal module configured to create a difference between a first analog signal and a second analog signal, the first analog signal and the second analog signal both being representative of an analog input signal;
   an amplifier module configured to amplify the first analog signal and the second analog signal, the amplifier module injecting harmonic distortion into the first analog signal to create a first amplified analog signal, and injecting the harmonic distortion into the second analog signal to create a second amplified analog signal;
   a detection analog-to-digital converter configured to convert from analog to digital each of the first amplified analog signal and the second amplified analog signal to generate respective first and second digital component signals;
   a distortion detection module configured to determine a distortion coefficient of the harmonic distortion based on the first digital component signal and the second digital component signal, the distortion detection module including a feedback loop that comprises:
      a first distorter configured to distort the first digital component signal based on the distortion coefficient; and
      a second distorter configured to distort the second digital component signal based on the distortion coefficient; and
   a distortion correction module configured to correct the harmonic distortion in a main digital signal based on the distortion coefficient.

2. The receiver of claim 1, further comprising a main analog-to-digital converter configured to convert to digital a sum of the first amplified analog signal and the second amplified analog signal to create the main digital signal.

3. The receiver of claim 2, wherein the detection analog-to-digital converter is slower and consumes less power as compared to the main analog-to-digital converter.

4. The receiver of claim 1, wherein the feedback loop further comprises:
   an adder configured to subtract the distorted first digital component signal from the distorted second digital component signal to create a distortion difference signal; and
   a least means squared filter configured to adjust the distortion coefficient based on the distortion difference signal.

5. The receiver of claim 4, wherein the least means squared filter provides the adjusted distortion coefficient to the first distorter and the second distorter in the feedback loop, and to the distortion correction module.

6. A receiver, comprising:
   a detection analog-to-digital converter configured to convert a split analog signal into the digital domain to generate a split digital signal, the split analog signal including a first component having harmonic distortion and a second component having the harmonic distortion;
   a distortion detection module configured to determine a distortion coefficient of the harmonic distortion based on the split digital signal, the distortion detection module including a feedback loop, the feedback loop including a distorter configured to distort the split digital signal based on the distortion coefficient; and
   a distortion correction module configured to receive the distortion coefficient from the distortion detection module and to correct the harmonic distortion in a main signal.

7. The receiver of claim 6, wherein the first component and the second component are generated from an analog input signal.

8. The receiver of claim 7, wherein the first component differs from the analog component by a difference signal.

9. The receiver of claim 8, wherein the main signal represents a sum of a first component of the split digital signal and a second component of the split digital signal.

10. The receiver of claim 6, wherein the feedback loop further includes
   a filter module configured to adjust a value of the distortion coefficient based on the distorted split digital signal.

11. The receiver of claim 10, wherein the feedback loop includes an adder configured to subtract a first component of the distorted split digital signal from a second component of the distorted split digital signal.

12. The receiver of claim 11, wherein the distortion detection module is configured to determine the distortion coefficient based on the difference between the first component of the distorted split digital signal and the second component of the distorted split digital signal.

13. A method of correcting for harmonic distortion generated in a receiver, the method comprising:
   generating, from an analog input signal, a first analog component signal and a second analog component signal that differ from each other by a difference signal and that each includes the harmonic distortion;

converting the first analog component signal to the digital domain to create a first digital component signal, and the second analog component signal to the digital domain to create a second digital component signal;

determining a distortion coefficient of the harmonic distortion based on the first digital component signal and the second digital component signal, the determining including:

distorting the first digital component signal by the distortion coefficient; and distorting the second digital component signal by the distortion coefficient; and correcting the harmonic distortion in a main digital signal based on the distortion coefficient.

14. The method of claim 13, further comprising generating the main digital signal by:

adding the first analog component signal to the second analog component signal; and converting the sum of the first analog component signal and the second analog component signal into the digital domain.

15. The method of claim 13, wherein the determining further includes adjusting the distortion coefficient based on the distorted first digital component signal and the distorted second digital component signal.

16. The method of claim 15, wherein the determining further includes determining a difference between the distorted first digital component signal and the distorted second digital component signal, and wherein the adjusting is performed based on the difference.

17. The method of claim 13, wherein the correcting includes distorting the main digital signal based on the distortion coefficient.

18. The method of claim 17, wherein the distorting of the main signal includes injecting third harmonic distortion into the main digital signal based on the distortion coefficient.

19. The receiver of claim 1, wherein the distortion coefficient is a polynomial coefficient corresponding to a third or higher order of harmonic distortion within a polynomial representation of the main digital signal.

20. The receiver of claim 1, wherein the difference is a DC offset voltage or current between the first analog input signal and the second analog input signal.

* * * * *